(12) United States Patent
Suzuki et al.

(10) Patent No.: US 8,804,269 B2
(45) Date of Patent: Aug. 12, 2014

(54) ADJUSTING ROTATIONAL SPEED BASED ON AMBIENT TEMPERATURE IN A HDD

(75) Inventors: Takao Suzuki, Kanagawa (JP); Kohji Takahashi, Kanagawa (JP); Tomoki Hiramatsu, Kanagawa (JP); Toshihisa Kiyonaga, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 209 days.

(21) Appl. No.: 13/312,871

(22) Filed: Dec. 6, 2011

(65) Prior Publication Data

US 2013/0141815 A1  Jun. 6, 2013

(51) Int. Cl.
 *G11B 15/46*  (2006.01)
(52) U.S. Cl.
 USPC .......................... 360/73.03; 360/70
(58) Field of Classification Search
 USPC ......... 360/73.03, 73.02, 73.01, 69, 55, 59, 75
 See application file for complete search history.

(56) References Cited

U.S. PATENT DOCUMENTS

| | | | |
|---|---|---|---|
| 5,412,519 A | 5/1995 | Buettner et al. | |
| 5,801,894 A | 9/1998 | Boutaghou et al. | |
| 6,078,158 A | 6/2000 | Heeren et al. | |
| 6,285,521 B1 | 9/2001 | Hussein | |
| 6,469,960 B1 * | 10/2002 | Miyoshi | 369/13.14 |
| 6,633,450 B1 * | 10/2003 | Kaneko | 360/73.03 |
| 6,717,763 B2 | 4/2004 | Ottesen et al. | |
| 6,954,320 B2 | 10/2005 | Yang | |
| 7,319,646 B2 | 1/2008 | Nishiguchi | |
| 7,576,936 B2 | 8/2009 | Oshimi et al. | |
| 2003/0103289 A1 * | 6/2003 | Sakamoto | 360/70 |
| 2004/0109397 A1 * | 6/2004 | Nishiguchi | 369/44.27 |
| 2009/0285514 A1 | 11/2009 | Hori et al. | |
| 2010/0195243 A1 * | 8/2010 | Zhu et al. | 360/73.03 |
| 2012/0218660 A1 * | 8/2012 | Suzuki et al. | 360/97.12 |

FOREIGN PATENT DOCUMENTS

| | | |
|---|---|---|
| EP | 1566797 | 4/2008 |
| JP | 6004988 | 1/1994 |
| JP | 2005-044505 | 2/2005 |

* cited by examiner

*Primary Examiner* — Tan X Dinh

(57) ABSTRACT

A HDD including a temperature sensor for sensing ambient temperature in the HDD, a spindle motor comprising a fluid dynamic bearing; and a controller configured for adjusting a rotational speed of the spindle motor based on the measured ambient temperature while a rigidity of the fluid dynamic bearing is maintained, and reducing power consumption of the HDD based on the adjusting the rotational speed of the spindle motor.

11 Claims, 5 Drawing Sheets

ADJUSTING ROTATIONAL SPEED BASED ON AMBIENT TEMPERATURE IN A HDD

BACKGROUND

Typically, the minimum rotational speed of a spindle motor is determined based on a fluid dynamic bearing to be able to maintain a required flying amount at 65 degrees Celsius. This temperature is the upper limit for the guaranteed operating temperature of the HDD. Accordingly, the rotational speed of the HDD is based on 65 C regardless of the ambient temperature of the HDD. As a result, there may be restrictions to the reduction of power consumption of the HDD in regards to the rotational speed of the spindle motor.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
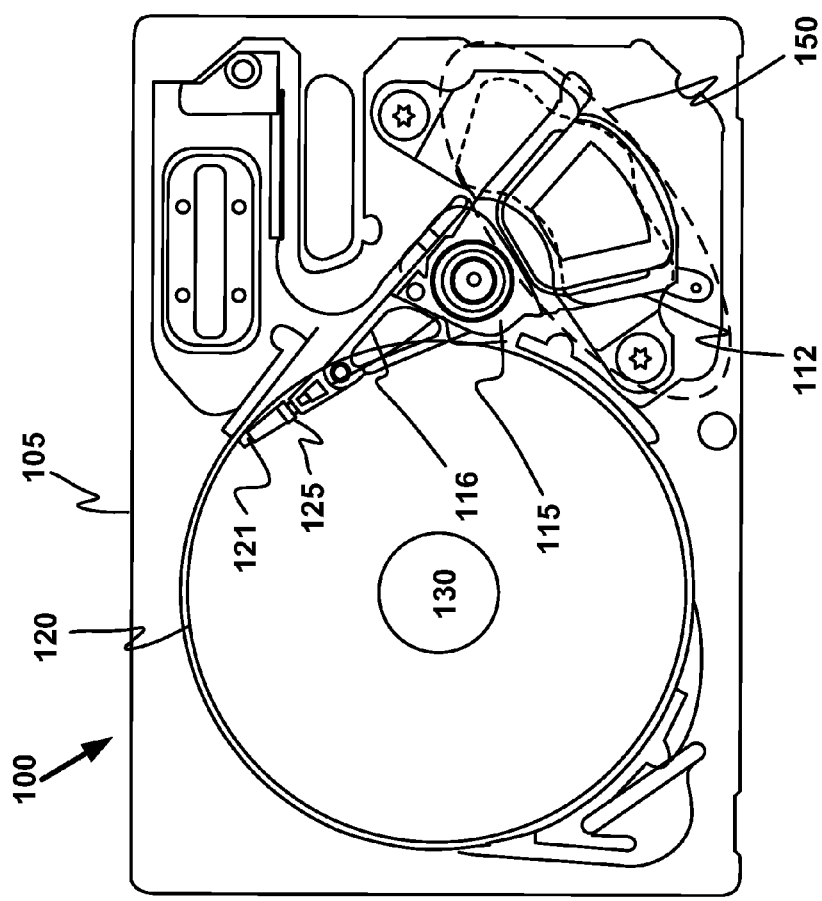
FIG. 1 illustrates an embodiment of an HDD.

With reference now to FIG. 1, a schematic drawing of one embodiment of an information storage system including a magnetic hard disk drive or HDD 100 for a computer system is shown, although only one head and one disk surface combination are shown. What is described herein for one head-disk combination is also applicable to multiple head-disk combinations. In other words, the present technology is independent of the number of head-disk combinations.

In general, HDD 100 has an outer sealed housing including a base 105 and a top or cover (not shown). In one embodiment, housing contains a disk pack having at least one media or magnetic disk 120. The disk stack (as represented by disk 120) defines an axis of rotation and a radial direction relative to the axis in which the disk pack is rotatable.

A spindle motor assembly 130 having a central drive hub operates as the axis and rotates the disk 120 or disks of the disk pack in the radial direction relative to base portion 105. An actuator assembly 115 includes one or more actuator arms 116. When a number of actuator arms 116 are present, they are usually represented in the form of a comb that is movably or pivotally mounted to base 105. A controller 150 is also mounted to base 105 for selectively moving the actuator arms 116 relative to the disk 120.

In one embodiment, each actuator arm 116 has extending from it at least one cantilevered integrated lead suspension (ILS) 125. The ILS 125 may be any form of lead suspension that can be used in a data access storage device. The level of integration containing the slider 121, ILS 125, and read/write head is called the Head Gimbal Assembly (HGA).

The ILS 125 has a spring-like quality, which biases or presses the air-bearing surface of slider 121 against disk 120 to cause slider 121 to fly at a precise distance from disk 120. ILS 125 has a hinge area that provides for the spring-like quality, and a flexing cable-type interconnect that supports read and write traces and electrical connections through the hinge area. A voice coil (not shown), free to move within voice coil motor (VCM) 112 is also mounted to actuator arms 116 opposite the head gimbal assemblies. Movement of the actuator assembly 115 by controller 150 causes the head gimbal assembly to move along radial arcs across tracks on the surface of disk 120.

Figure 2:
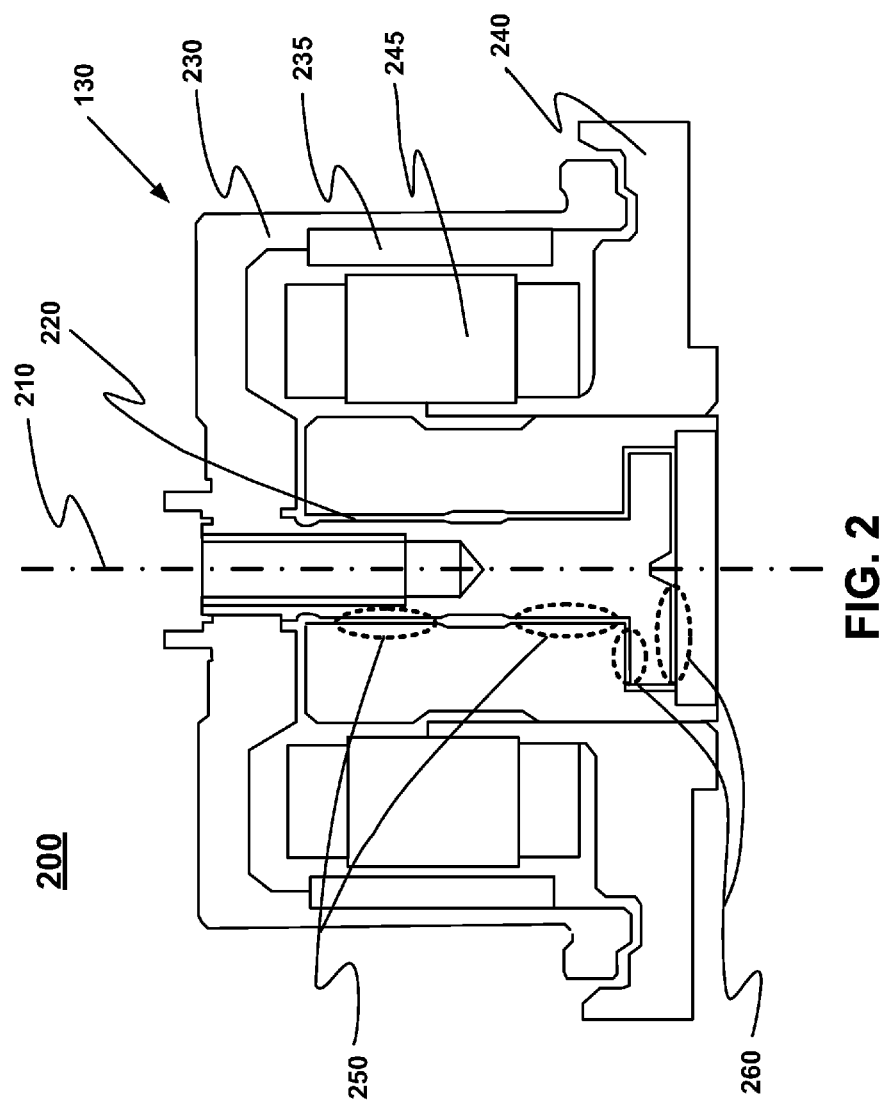
FIG. 2 illustrates an embodiment of a spindle motor assembly.

FIG. 2 depicts an embodiment of a cross-section view 200 of spindle motor assembly 130. In general, spindle motor assembly 130 supports disk stack 120 so that the disk surface can be spun adjacent to slider 121 and thus allow the magnetic head to read and write data tracks on the disk surface.

Spindle motor assembly 130 includes a fluid dynamic bearing (FDB). Several components are joined together to form rotor 230 and stator 240. Motor magnet 235, which is coupled to rotor 230 and motor winding 245, which is coupled to stator 240, are considered to be parts of rotor 230 and stator 240.

Since rotor 230 and stator 240 are the major structural components of spindle motor assembly 130, rotor 230 and stator 240 also share the same axes of symmetry and are coincident with axis 210. Rotor 230 is retained by its geometry to rotate about stator 240. Generally, features shown in cross-section 200 are circular and symmetric about axis 210. Therefore, a feature shown or highlighted in cross-section 200 on one side of axis 210 is normally the same feature found on the other side of axis 210.

Gap 220 is comprised of the outer surface of rotor 230 and the inner surface of stator 240. Four zones of gap 220 are highlighted in FIG. 2. Two zones are denoted as zones 250, and two zones are denoted as zones 260. Zones 250 produce radial stiffness or rigidity for the FDB. Zones 260 produce axial stiffness or rigidity for the FDB. Each surface is patterned (e.g., V-shaped, U-shaped, herringbone, etc.) in such a manner as to be conducive to supporting a film of fluid and to impart movement to this fluid, which is placed in gap 220. The moving fluid produces a film that is resistant to collapsing and hence prevents juxtaposed surfaces from coming in contact. This film couples rotor 230 to stator 240 such that rotor 230 maintains a constant separation (gap 220) from stator 240 while allowing rotor 230 to rotate freely.

The moving fluid that comprises the fluid dynamic bearing is also a lubricating fluid or oil. The lubricating properties of the moving fluid are required for the occasion of contact between the juxtaposed surfaces of rotor 230 and stator 240. Contact occurs primarily upon start and stop of rotation of spindle motor assembly 130. For example, at the operating condition of starting, the fluid in gap 220 is not moving and has not established the FDB. Additionally, at the operating condition of stopping, the moving fluid in gap 220 ceases to move and the FDB is no longer established.

The frictional resistance produced during rotation of spindle motor assembly 130 employing an FDB is mainly caused by the viscosity of the lubricating fluid. The viscosity of the lubricating fluid is highly temperature dependent. Accordingly, the viscosity increases at low temperatures and, therefore, a large starting torque is needed to allow low-temperature start up.

The lubricating fluid has low viscosity at high temperature, and therefore, the amount by which the rotary member flies is reduced. In other words, the separation between stator 240 and rotor 230 (at the gaps) is reduced.

Typically, in conventional systems, the minimum flying rotation speed is set in such a way that the minimum required flying amount can be maintained at 65 Celsius (C), which is the upper limit for the guaranteed operating temperature of a magnetic disk device. This minimum required flying amount is verified by subjecting the disk device to operating shock tests and reliability evaluations, such as long-run tests. As a result, there are restrictions regarding power consumption by means of the rated rotational speed of magnetic disk drives.

In contrast, as described in various embodiments herein, power consumed by the magnetic disk drive is reduced by lowering the rotational speed of the spindle motor during low power idle.

In general, magnetic disk devices read and write data according to host requests. If there are not requests from the host for a fixed time, then magnetic disk device moves into an idle mode in order to suppress power consumption in the device as a whole.

In various embodiments, idle mode includes, but is not limited to, performance idle, active idle and lower power idle.

Performance idle is a state in which data is not being read or written, but all functions are enabled and data can read or be written at any time.

In active idle, servo control for positioning the actuator to which the magnetic head is attached over the magnetic disk is off, but the magnetic head flies above the magnetic disk. The channel for reading and writing data is in a standby state. Servo control and the channel are periodically switched on, whereby the actuator is positioned in the center region of the magnetic disk.

In low power idle, the magnetic head is retracted over a ramp. Servo control and the channel are off, but the spindle motor is in a state of rotation.

In one embodiment, in idle mode, the magnetic disk device automatically shifts between performance, active and low power idle modes according to the interval of host requests.

In particular, in low power idle, the magnetic head is not above the magnetic disk. Therefore, the spindle motor can rotate at a lower speed of rotation than the rated speed of rotation. As a result, the overall power consumption of the magnetic disk device is reduced It is understood that lowering the rotational speed of the spindle motor directly reduces the power consumption of the magnetic disk device. Moreover, it is not possible to lower the rotational speed in the data read/write state or in the state in which the head slider is flying above the magnetic disk. This is because if the rotational speed decreases, the amount by which the head slider flies also decreases. Therefore, there is an increased risk of the head slider coming into contact with the surface of the magnetic disk. Furthermore, the balance of the lift produced by the head slider and the force whereby the head slider is pressed toward the magnetic disk by the suspension (gram load) is upset. Accordingly, the power consumed by the magnetic disk device is reduced by lowering the rotational speed of the spindle motor during low power idle.

Typically, in conventional systems, the guaranteed operating temperature of the magnetic disk device is between −5 C and 65 C. At the maximum operating temperature (e.g., 65 C), when viscosity of the lubricating fluid in the FDB is at its lowest, the minimum rotation speed for flying the FDB is conventionally set in such a way that it is possible to maintain the minimum required amount of flying in the FDB. The minimum rotational speed for flying is determined from the specification relating to resistance to operating shock of the magnetic disk drive. That is, normal operation is still required when a shock of magnitude 400 G and duration of 2 msec is applied to the magnetic disk device. By setting the minimum rotational speed for flying at 65 C, the operating shock resistance is also achieved at all environmental (or ambient) temperatures, and the device is designed with a view to erring on the side of caution. This is because the viscosity of the lubricating fluid in the FDB increases below 65 C, and therefore the increase acts as a margin.

Figure 3:
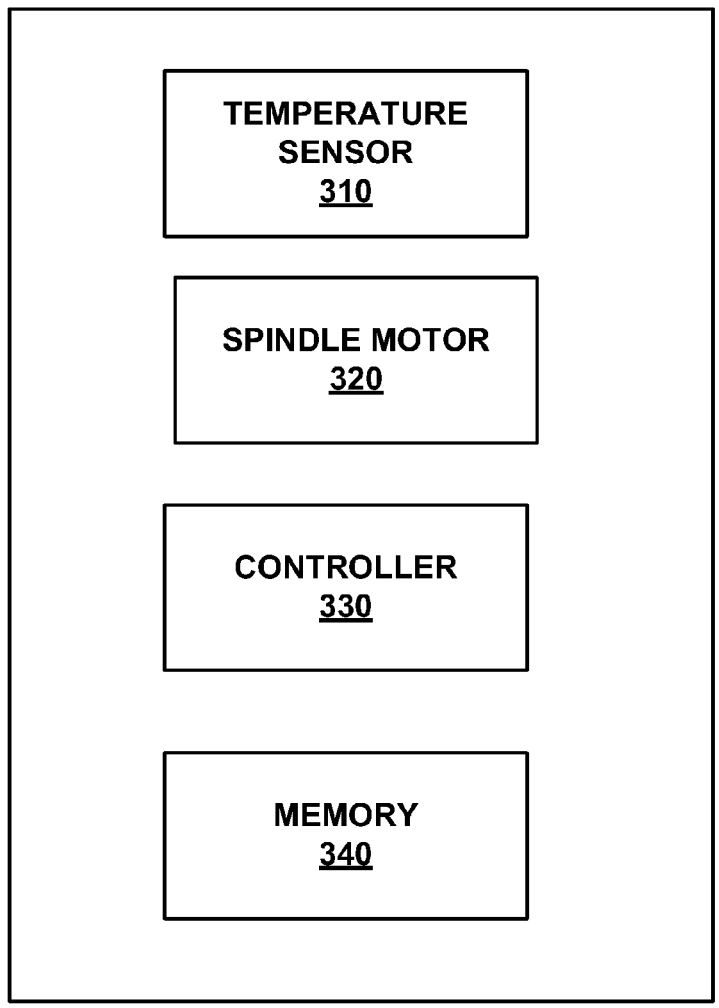
FIG. 3 illustrates an embodiment of an HDD.

However, accordingly to embodiments described herein, the rotational speed of the spindle motor during low power idle is lowered in response to the environmental temperature where the magnetic disk device is operating. For example, FIG. 3 depicts an embodiment of HDD 300 configured for adjusting the rotational speed of a spindle motor during low power idle in response to ambient temperature. HDD 300 includes temperature sensor 310, spindle motor 320, controller 330 and memory 340.

Accordingly, temperature sensor 310 senses temperature within HDD 300 and controller 330 is configured to adjust the rotational speed of spindle motor 320 based on the ambient temperature.

In various embodiments, if the minimum speed for flying the FDB at 65 C is 4500 RPM, then when the operating temperature is 25 C, the viscosity of the lubricating fluid in the FDB increases, so the flying amount and rigidity can be maintained to the extent that it is still possible to withstand an operating shock at a rotational speed of less than 4500 RPM. If the rotational speed is 4200 RPM, the drive current of the spindle motor is less than 5 milliamps (mA). As a result, the power consumption is reduced commensurately.

In one embodiment, the rated rotational speed of spindle motor assembly 130 is 5400 rpm. As such, a reduction of the rotational speed of spindle motor assembly 130 while maintaining rigidity of the FDB reduces power consumption.

For example, the FDB of spindle motor assembly 130 with a rotational speed of 4500 rpm, can maintain the requisite flying amount and rigidity while withstanding an operation shock (e.g., 400 G, 2 msec) at 65 C.

In one embodiment, the rotational speed of spindle motor assembly 130 is adjusted to 3900 rpm during low power idle, when the temperature was from −5 C to less than 25 C.

In another embodiment, the rotational speed is adjusted to 4200 rpm when the environmental temperature is from 25 C to less than 45 C.

In a further embodiment, the rotational speed is adjusted to 4500 rpm when the environmental temperature is from 45 C to less than 65 C.

In one embodiment, at a rotational speed of 4500 rpm at 65 C, the specific spacing of the FDB was at least around 0.25 (where a spacing is 1 when the spindle motor has a rotational speed of 5400 rpm at 25 C.

Figure 4:
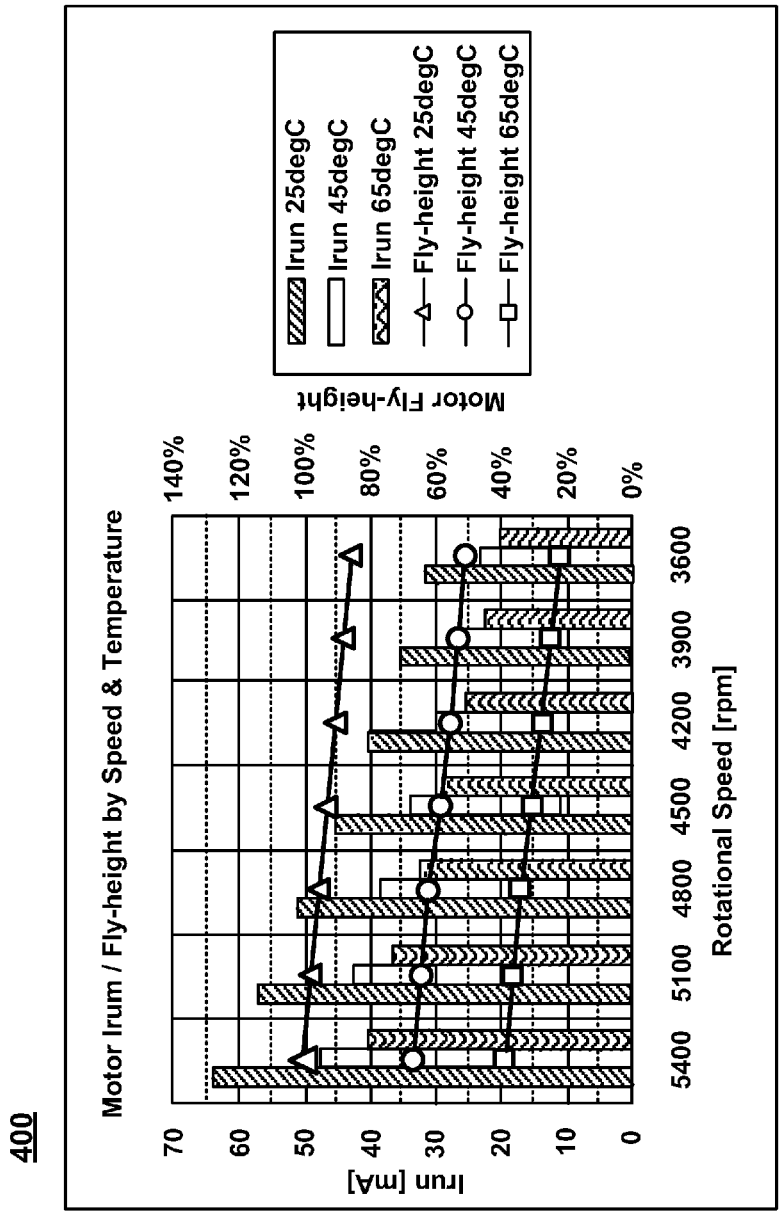
FIG. 4 illustrates an embodiment of a graph regarding FDB fly amount in accordance with the rotational speed of the spindle motor.

FIG. 4 depicts graph 400 that illustrates the FDB fly amount in accordance with the rotational speed of the spindle motor, where the spindle motor current values are at environmental temperatures of 25 C, 45 C and 65 C, respectively. For example, when the rotational speed is reduced from 4500 rpm to 4200 rpm, the spindle motor current value drops below around 5 mA in response. Similarly, when the rotational speed is reduced from 4500 rpm to 3900 rpm at an environment temperature of 25 C, the spindle motor current value drops below around 10 mA in response. Accordingly, the power consumed by the magnetic disk device decreases in proportion to the drop in current value.

In various embodiments, the magnetic disk drive automatically shifts between the idle modes (e.g., standby, performance idle, active idle, low power idle, etc.) according to the interval of the host requests. In a benchmark test of the power consumption, each mode was set with the following proportions and the power consumption was calculated with regard to power consumption during standby (e.g., standby 14%, performance idle 30%, active idle 18%, and low power idle 38%). As such, reduction of the spindle motor current value in low power idle contributed most to reducing the overall power consumption of the magnetic disk drive.

In one embodiment, when the rotational speed is reduced from 5400 rpm to 3600 rpm, there is a 5% total power consumption reduction.

FIG. 4 depicts three different temperatures temperature regions (i.e., 25 C, 45 C, and 65 C). However, the rotational speed may be adjusted based on different temperature regions. For example, the environmental temperature may be separated into six regions in order to set finer spindle motor rotational speeds. The regions may be: −5 C to less than 15 C, 15 C to less than 25 C, 25 C to less than 35 C, 35 C to less than 45 C, 45 C to less than 55 C, and 55 C to 65 C. Accordingly, spindle motor control parameters corresponding to each rotational speed would be preset and stored in six different tables in memory (e.g., memory 340).

In one embodiment, there may be 12 different temperature regions.

It should be appreciated that spindle motor rotational speeds are set corresponding to one environmental temperature. Accordingly, the table becomes larger so the spindle motor control parameters corresponding to each rotational speed may not be stored in table format. As such, parameters for certain specified environmental temperatures (e.g., 25 C, 45 C and 60 C) are interpolated by linear expression or the like, whereby spindle motor rotational speeds corresponding to the actual environmental temperature and the control parameters are calculated for use.

Figure 5:
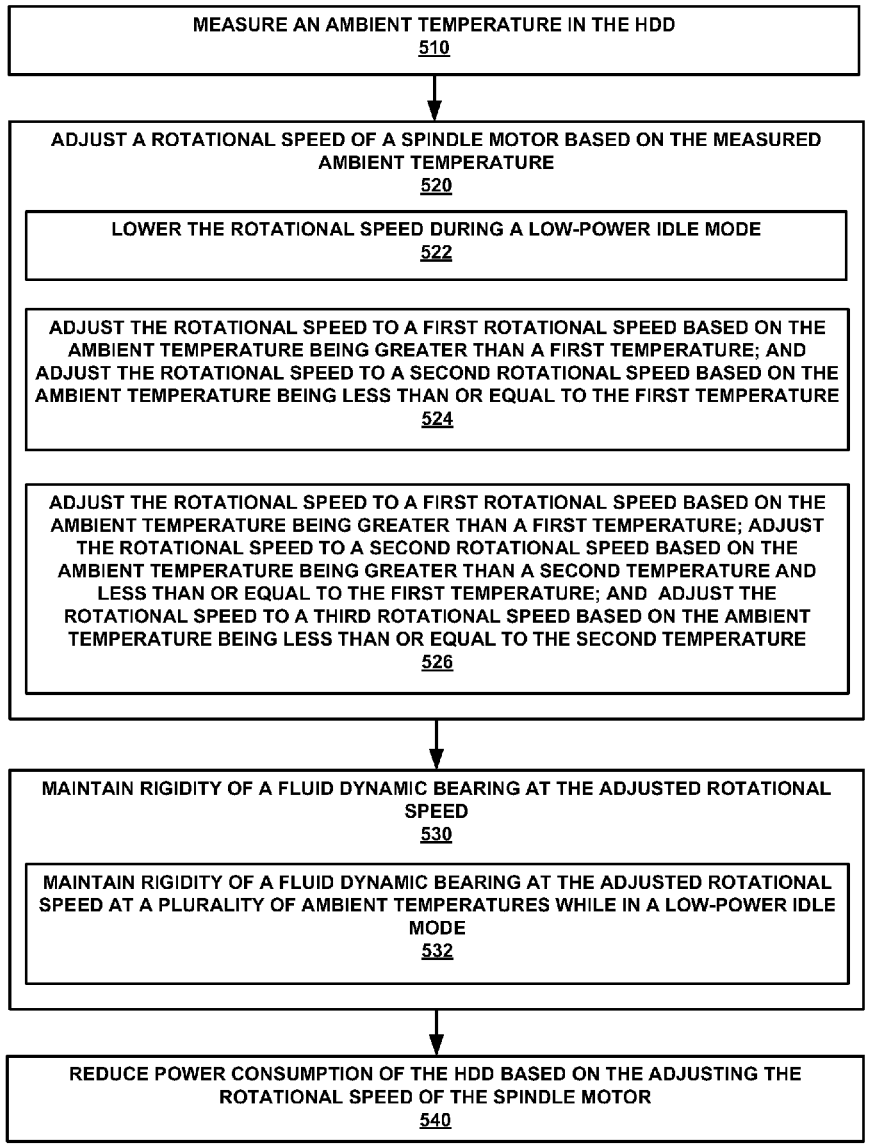
FIG. 5 illustrates an embodiment of a method for adjusting rotational speed based on ambient temperature in a hard disk drive.

FIG. 5 depicts an embodiment of a method 500 for adjusting rotational speed based on ambient temperature in a hard disk drive. In various embodiments, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 500 is performed at least by HDD 100 or 300, as depicted in FIGS. 1 and 3, respectively.

At 510 of method 500, an ambient temperature in the HDD is measured. For example, temperature sensor 310 disposed in HDD 300 (or HDD 100) measures the ambient temperature in HDD 300 (or HDD 100).

At 520, a rotational speed of a spindle motor based on the measured ambient temperature is adjusted. For example, in response to the measured ambient temperature, controller 330 adjusts the rotational speed of spindle motor assembly 130.

At 522, the rotational speed is adjusted during a low-power idle mode. For example, controller 330 adjusts the rotational speed of spindle motor assembly 130 during a low-power mode (e.g., when the magnetic head is retracted over a ramp).

At 524, the rotational speed is adjusted to a first rotational speed (e.g., 4500 RPM) based on the ambient temperature being greater than a first temperature (e.g., 65 C), and the rotational speed is adjusted to a second rotational speed (e.g., 4200 RPM) based on the ambient temperature being less than or equal to the first temperature. It should be appreciated that controller 330 adjusts the rotational speeds.

At 526, the rotational speed is adjusted to a first rotational speed (e.g., 4500 RPM) based on the ambient temperature being greater than a first temperature (e.g., 65 C), the rotational speed is adjusted to a second rotational speed (e.g., 4200 RPM) based on the ambient temperature being greater than a second temperature (e.g., 45 C) and less than or equal to the first temperature, and the rotational speed is adjusted to a third rotational speed (e.g., 3900 RPM) based on the ambient temperature being less than or equal to the second temperature. It should be appreciated that controller 330 adjusts the rotational speeds.

At 530, the rigidity of a FDB is maintained at the adjusted rotational speed. In one embodiment, at 532, the rigidity of the FDB is maintained at the adjusted rotational speed at a plurality of ambient temperatures while in a low-power idle mode.

At 540, power consumption of the HDD is reduced based on the adjusting the rotational speed of the spindle motor.

Various embodiments of the present invention are thus described. While the present invention has been described in particular embodiments, it should be appreciated that the present invention should not be construed as limited by such embodiments, but rather construed according to the following claims

What is claimed is:

1. A hard disk drive (HDD) comprising:
   a temperature sensor for measuring ambient temperature in said HDD;
   a spindle motor comprising a fluid dynamic bearing;
   a controller configured for adjusting a rotational speed of said spindle motor based on said measured ambient temperature while a rigidity of said fluid dynamic bearing is maintained, and reducing power consumption of said HDD based on said adjusting said rotational speed of said spindle motor, wherein said controller is further configured for:
      adjusting said rotational speed to a first rotational speed based on said ambient temperature being greater than a first temperature; and
      adjusting said rotational speed to a second rotational speed based on said ambient temperature being less than or equal to the first temperature, wherein said first temperature is 45 degrees Celsius,
      wherein said first rotational speed is 4500 RPM, and wherein said second rotational speed is 4300 RPM; and
   memory for storing preset rotational speeds.

2. The HDD of claim 1, wherein said controller is further configured for:
   lowering said rotational speed during a low-power idle mode.

3. The HDD of claim 1, wherein said controller is further configured for:
   adjusting said rotational speed to a first rotational speed based on said ambient temperature being greater than a first temperature;

adjusting said rotational speed to a second rotational speed based on said ambient temperature being greater than a second temperature and less than or equal to the first temperature; and adjusting said rotational speed to a third rotational speed based on said ambient temperature being less than or equal to the second temperature.

4. The HDD of claim 3, wherein said first temperature is 65 degrees Celsius, wherein said first rotational speed is 4500 RPM, wherein said second temperature is 45 degrees Celsius, wherein said second rotational speed is 4300 RPM, and wherein said third rotational speed is 3900 RPM.

5. The HDD of claim 1, wherein said dynamic bearing is configured for maintaining rigidity at said adjusted rotational speed at a plurality of ambient temperatures while in a low-power idle mode.

6. A method for adjusting rotational speed based on ambient temperature in a hard disk drive (HDD), said method comprising:

measuring an ambient temperature in said HDD;
storing preset rotational speeds in memory;
adjusting a rotational speed of a spindle motor based on said measured ambient temperature, wherein adjusting said rotational speed further comprises:
adjusting said rotational speed to a first rotational speed based on said ambient temperature being greater than a first temperature;
adjusting said rotational speed to a second rotational speed based on said ambient temperature being greater than a second temperature and less than or equal to the first temperature; and
adjusting said rotational speed to a third rotational speed based on said ambient temperature being less than or equal to the second temperature;

adjusting said rotational speed to a second rotational speed based on said ambient temperature being less than or equal to a first temperature;

maintaining rigidity of a fluid dynamic bearing at said adjusted rotational speed; and reducing power consumption of said HDD based on said adjusting said rotational speed of said spindle motor.

7. The method of claim 6, wherein said adjusting said rotational speed further comprises:
lowering said rotational speed during a low-power idle mode.

8. The method of claim 6, wherein adjusting said rotational speed further comprises:
adjusting said rotational speed to a first rotational speed based on said ambient temperature being greater than a first temperature; and
adjusting said rotational speed to a second rotational speed based on said ambient temperature being less than or equal to the first temperature.

9. The method of claim 8, wherein said first temperature is 45 degrees Celsius, wherein said first rotational speed is 4500 RPM, and wherein said second rotational speed is 4300 RPM.

10. The method of claim 6, wherein said first temperature is 45 degrees Celsius, wherein said first rotational speed is 4500 RPM, wherein said second temperature is 25 degrees Celsius, wherein said second rotational speed is 4300 RPM, and wherein said third rotational speed is 3900 RPM.

11. The method of claim 6, wherein maintaining rigidity of a fluid dynamic bearing further comprises:
maintaining rigidity of a fluid dynamic bearing at said adjusted rotational speed at a plurality of ambient temperatures while in a low-power idle mode.

* * * * *